(12) United States Patent  (10) Patent No.: US 9,317,315 B2
Mehta  (45) Date of Patent: Apr. 19, 2016

(54) METHOD FOR GENERATING SECURE SNAPSHOTS

(75) Inventor: Bhavesh Mehta, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 968 days.

(21) Appl. No.: 13/213,586

(22) Filed: Aug. 19, 2011

(65) Prior Publication Data

US 2013/0047154 A1  Feb. 21, 2013

(51) Int. Cl.
*G06F 9/455* (2006.01)

(52) U.S. Cl.
CPC .. *G06F 9/45558* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| 8,046,550 B2 * | 10/2011 | Feathergill | 711/162 |
| 2005/0229247 A1 * | 10/2005 | Ishidera | 726/17 |
| 2011/0035574 A1 * | 2/2011 | Jevans et al. | 713/2 |

* cited by examiner

*Primary Examiner* — Eric C Wai

(57) ABSTRACT

In a technique for creating a secure snapshot of a virtual machine, a guest operating system of the virtual machine is caused to enter a locked state prior to the snapshot of the virtual machine being created. When the snapshot is subsequently used to restore the virtual machine, the guest operating system of the virtual machine is restored in a locked state and credentials are required to access the guest operating system.

18 Claims, 7 Drawing Sheets

METHOD FOR GENERATING SECURE SNAPSHOTS

BACKGROUND

Over recent years, the usage of virtual machines (VMs) has significantly increased due to the flexibility and efficiency that they provide. Certain VM systems are managed using a graphical user interface (GUI) application, which provides an intuitive visual interface for managing individual virtual machine instances. One example GUI known in the art is included in a vSphere® Client software product sold by VMware, Inc. of Palo Alto, Calif. This software product enables users to direct various commands to VMs. One of the commands enables users to create a snapshot or checkpoint of a VM and another enables a user to restore a VM from a snapshot.

Users are able to centrally manage these snapshots using vSphere. Specifically, a user can perform a restoration of a VM by selecting, from a database of snapshots, a snapshot that either he or she created, or a snapshot that was created by another administrator. Unfortunately, a user who has access to a snapshot also has access to any processes that were being executed in the VM at the time the snapshot was created. For example, a snapshot of a VM might include a guest OS executing an application that exposes sensitive information, e.g., banking software that was logged into and left active when the snapshot was taken. Moreover, embedded networking security protocols that are validated simply by being logged into the guest OS, e.g., Microsoft Windows networking, are left intact and are available to the user who restores the snapshot, which potentially enables him or her to access network resources he or she should be unable to view, e.g., shared drives and protected network files.

One approach to alleviate the foregoing problem involves encrypting the snapshot such that a decryption key is required prior to performing the restoration of the snapshot. Encrypting snapshots, however, takes a considerable amount of time because snapshots are typically large in size. In addition, providing secure management and transmission of decryption keys between users of a virtualized system introduces additional complexities.

SUMMARY

One or more embodiments of the present invention provide a technique for creating a secure snapshot of a virtual machine. In this technique, a guest operating system of a virtual machine is forced into a locked state prior to a snapshot of the virtual machine being created. When the snapshot is subsequently used to restore the virtual machine, the guest operating system of the virtual machine is restored in a locked state and credentials are required to access the guest operating system.

A method according to an embodiment of the present invention generates a snapshot of a virtual machine. The method includes the steps of receiving a request to generate a snapshot of the virtual machine, transmitting a first command to lock an operating system being executed by the virtual machine, and transmitting a second command to create the snapshot of the virtual machine.

Another embodiment of the present invention includes a non-transitory computer readable storage medium that stores instructions to be executed in a processing unit of a computer system, wherein the instructions when executed in the processing unit carry out the steps of: receiving a command to force an operating system into a locked state, parsing one or more scripts included in the operating system to locate a script that, when executed, forces the operating system into a locked state, causing the script to be executed, and receiving an acknowledgement that the script has executed.

Further embodiments of the present invention include a non-transitory computer readable storage medium that stores instructions to be executed in a processing unit of a computer system, wherein the instructions when executed in the processing unit carry out the steps of: receiving a request to generate a snapshot of the virtual machine, transmitting, via one or more network packets, a first command and one or more scripts that, when received and processed by an operating system being executed by the virtual machine, forces the operating system into a locked state, and transmitting a second command to create the snapshot of the virtual machine.

DETAILED DESCRIPTION

Figure 1:
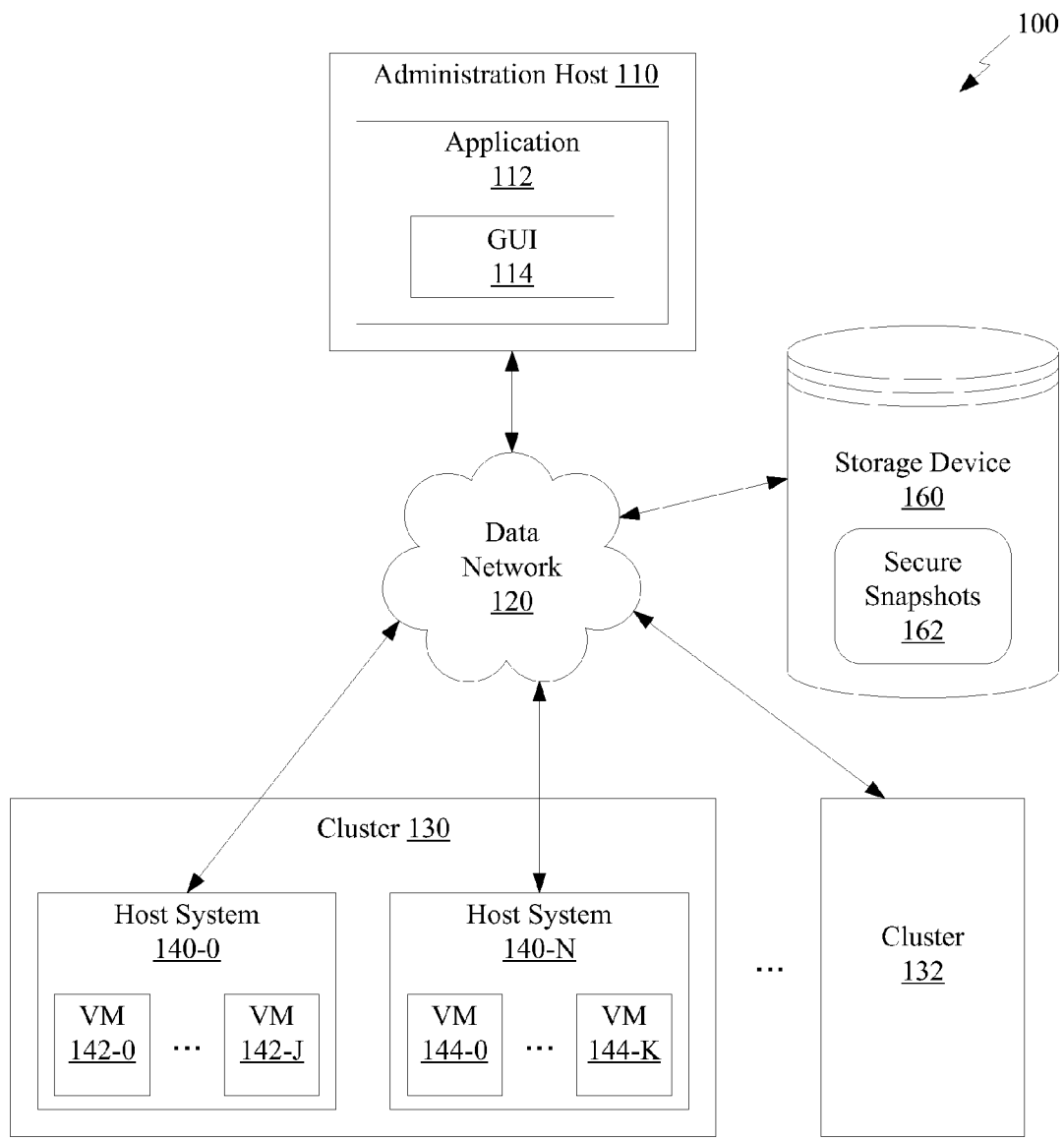
FIG. 1 illustrates a virtual machine system comprising an administration host configured to manage virtual machines executing on plural hosts, according to one embodiment of the present invention.

FIG. 1 illustrates a virtual machine system 100 comprising an administration host 110 configured to manage virtual machines 142, 144 executing on plural hosts 140, according to one embodiment of the present invention. The virtual machine system 100 comprises the administration host 110, a data network 120, and cluster 130. The administration host 110 includes a management application 112 configured to facilitate management of the virtual machines (VMs) 142, 144. The administration host 110 is coupled to the cluster 130 via data network 120. Data network 120 may comprise any technically feasible networking system. For example, data network 120 may implement an industry standard Ethernet switched network, internet protocol (IP) routed network, or any combination thereof. Alternately, the data network 120 may implement a Fibre Channel switched network.

Cluster 130 comprises one or more host systems 140, configured to execute VMs 142, 144. It should be noted that in the description provided herein an element that has multiple instances (e.g., N), such as host system 140, is referred to individually as 140-*i* (where i is any one of 1 to N) and collectively as 140. As shown, host system 140-0 is configured to execute VMs 142-0 through 142-J, while host system 140-N is configured to execute VMs 144-0 through 144-K. The virtual machine system 100 may also include additional clusters, such as cluster 132, which is structured substantially similar to cluster 130. As described in further detail below in conjunction with FIGS. 2A-2B, each host system 140 may comprise a computational platform, such as a general-purpose computer system. More specifically, each host system 140 may include local mass storage, networked mass storage, or a combination thereof based on specific implementation requirements.

The management application 112 is configured to communicate with host systems 140 via data network 120 to configure, manage, and interact with VMs 142, 144. For example, management application 112 can instruct a specific VM to turn on, turn off, and pause execution. Management application 112 can also connect to a particular VM to enable a user to interact with a guest operating system (OS) and guest applications executing within the VM. The graphical user interface (GUI) module 114 provides specific tools, detailed in greater detail below in FIG. 3 for selecting one or more VMs from VMs 142-0 through 144-K, and for accepting management commands from the user for the selected VMs. Specifically, management application 112 enables the user to generate a secure snapshot of a specific VM, where the snapshot can be used to subsequently restore the VM to an identical state to when the snapshot was taken. In one embodiment, secure snapshots 162 are stored in a storage device 160 accessible to both application 112 and host systems 140 over data network 120. Alternatively, the secure snapshots can be stored in a storage device accessible over a storage area network (SAN) or local to host systems 140.

Figure 2A:
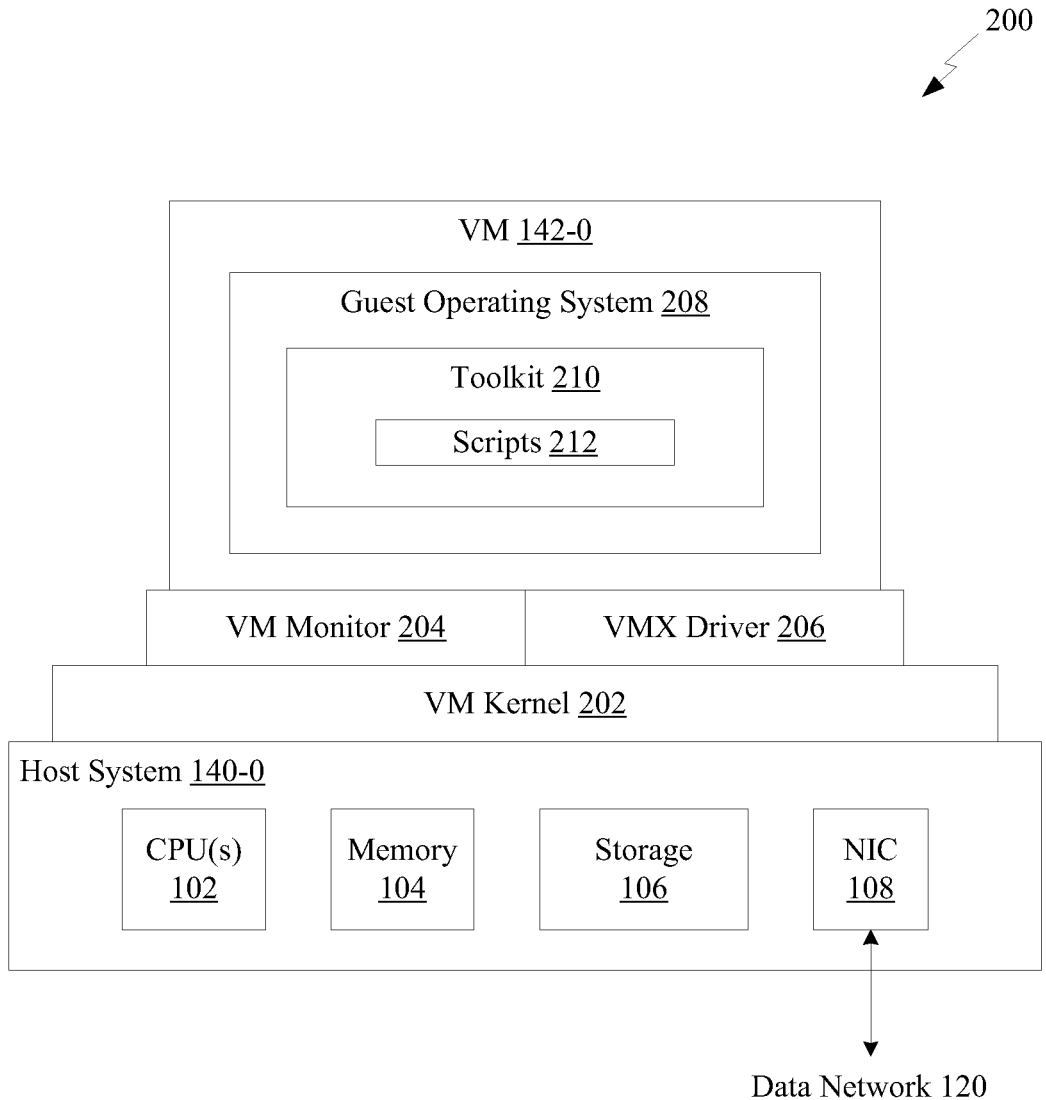
FIG. 2A illustrates a host system configuration that allows a user to lock a guest operating system executing within a virtual machine via executable scripts, according to one embodiment of the invention.

FIG. 2A illustrates a host system 140-0 configuration 200 that allows the user to lock a guest operating system executing within VM 142-0 via executable scripts, according to one embodiment of the invention. As shown, host system 140-0 may be a general purpose computer system such as a workstation, laptop, etc., for use by the user. In one embodiment, host system 140-0 includes one or more processors (CPUs) 102, memory 104 for volatile data storage, storage 106 for non-volatile data storage, and network interface card (NIC) 108. Storage 106 may be implemented using traditional rotating media or using a solid state technology. As also shown, host system 140-0 is in electronic communication with management application 112 via data network 120.

Running at system level is a virtual machine (VM) kernel 202 which is a software interface layer that executes on host system 140-0 and enables sharing of the hardware resources included therein. VM kernel 202 may run on top of an operating system executing on host system 140-0 or directly on hardware components of host system 140-0. Also running at system level is virtual machine monitor (VMM) 204, which supports VM 142-0. More generally, the VM kernel 202 and the VMM 204 may be referred to collectively as virtualization software or virtualization logic, which may include systems in which some or all virtualization functionality is implemented in firmware or hardware. Virtualization software or virtualization logic may also take various other forms that may not be readily described in terms of a VM kernel and/or a VMM. Guest operating system 208 executes under the control of VMM 204 and may be an embedded operating system or a commodity operating system such as Microsoft® Windows®. VMM 204 is in communication with VMX driver 206, which enables execution of scripts 212 that are specific to guest operating system 208, where scripts 212 are included in a toolkit 210 that is installed in guest operating system 208. For example, VMware® Tools may be installed within guest operating system 208 to enhance the virtualization functionality thereof, including better video output, mouse and keyboard interaction, networking, and to provide scripts 212 described above. An installer for VMware Tools, when executed, detects the type of operating system of guest operating system 208 and accordingly adjusts the installation process. For example, if guest operating system 208 is a Linux OS, then scripts 212 are specifically configured to be compatible with the Linux OS. Embodiments of the invention may require that scripts 212 include at least a set of instructions that, when executed, cause guest operating system 208 to enter into a "locked" state, i.e., where guest operating system 208 is protected by a login screen that requires credentials of an authorized user to be entered. Additionally, guest operating system 208 optionally includes one or more virtual network cards (vNICs) that enable guest operating system 208 to communicate over data network 120 via NIC 108, as described in further detail below in conjunction with FIG. 2B.

In some embodiments, administrators of virtual machine system 100 may exclude toolkit 210 from one or more VMs to, e.g., reduce the memory requirements or installation latencies thereof. Because embodiments of the invention generally require guest operating system 208 to be locked to create a secure snapshot, exclusion of toolkit 210 requires that alternative methods of locking guest operating system 208 are implemented, some of which are described below in conjunction with FIG. 2B.

Figure 2B:
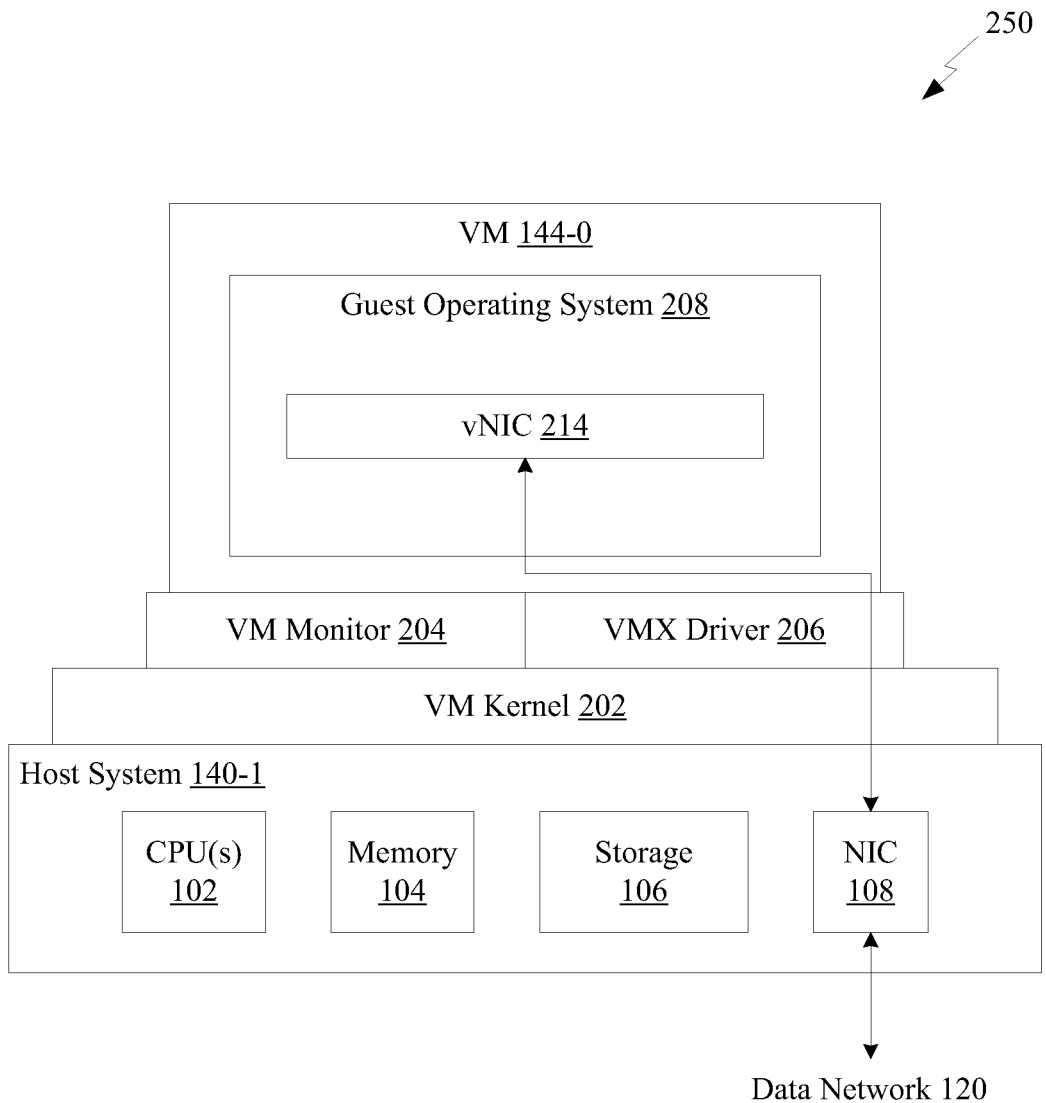
FIG. 2B illustrates a host system configuration that allows the user to lock a guest operating system executing within a virtual machine via network packets, according to one embodiment of the invention.

FIG. 2B illustrates a host system 140-1 configuration 250 that allows the user to lock a guest operating system executing within VM 144-0 via network packets, according to one embodiment of the invention. Here, host system 140-1 generally includes the same configuration of host system 140-0 described above in conjunction with FIG. 2A. However, as shown, toolkit 210 and scripts 212 are excluded from guest operating system 208 and replaced by a virtual NIC (vNIC) 214. The vNIC 214 enables application 112 to communicate directly with VM 144-0 to facilitate locking guest operating system 208 without requiring scripts 212 to be included in host system 140-1. For example, if guest operating system 208 is a version of Microsoft® Windows®, then application 112 can send network packets via, e.g., Windows Management Console, a software application included in Windows® that enables the receipt and processing of commands over a network, i.e., network packets that cause the operating system to enter into a locked state. Microsoft® environments also enable locking of guest operating system 208 via Windows® PowerShell commands, Windows® Management Instrumentation (WMI), remote procedure calls (RPCs), and web-services management. Alternatively, when guest operating system 208 is a version of, e.g., Linux, then application 112 is configured to communicate with guest operating system 208 via network packets sent using a third-party program, e.g., secure shell (SSH) for Linux.

Figure 3:
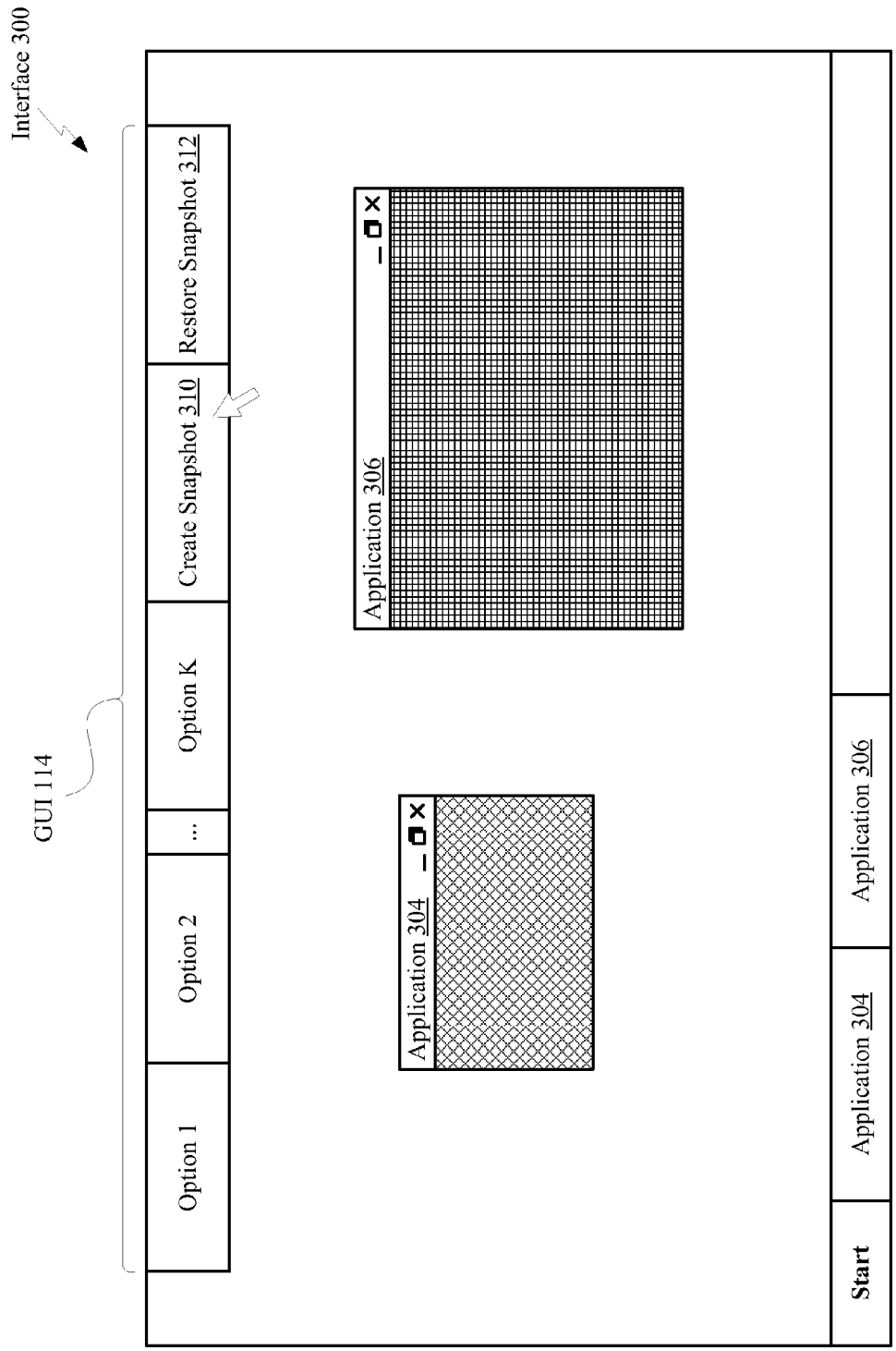
FIG. 3 illustrates an exemplary configuration of a GUI that enables a user to create a secure snapshot, according to one embodiment of the present invention.

FIG. 3 illustrates an exemplary configuration of GUI 114, according to one embodiment of the present invention. Here, a user is viewing an interface 300 of an operating system that is executing application 112. As shown, interface 300 includes one or more GUIs for additional applications that are executing within the operating system, i.e., application 304 and application 306. In one embodiment, GUI 114 includes a plurality of UI elements that are selectable by a user to perform tasks specific to a virtual machine executing within a host. For example, as illustrated, GUI 114 includes a snapshot 310 UI element that, when selected, causes application 112 to execute a secure snapshot of a virtual machine, e.g., VM 142-0, as described in further detail below in conjunction with FIGS. 4 and 5. Additionally, GUI 114 includes a restore snapshot 312 UI element that, when selected, causes application 112 to restore a secure snapshot of a virtual machine, e.g., VM 142-0, as described in further detail below in conjunction with FIG. 6.

Figure 4:
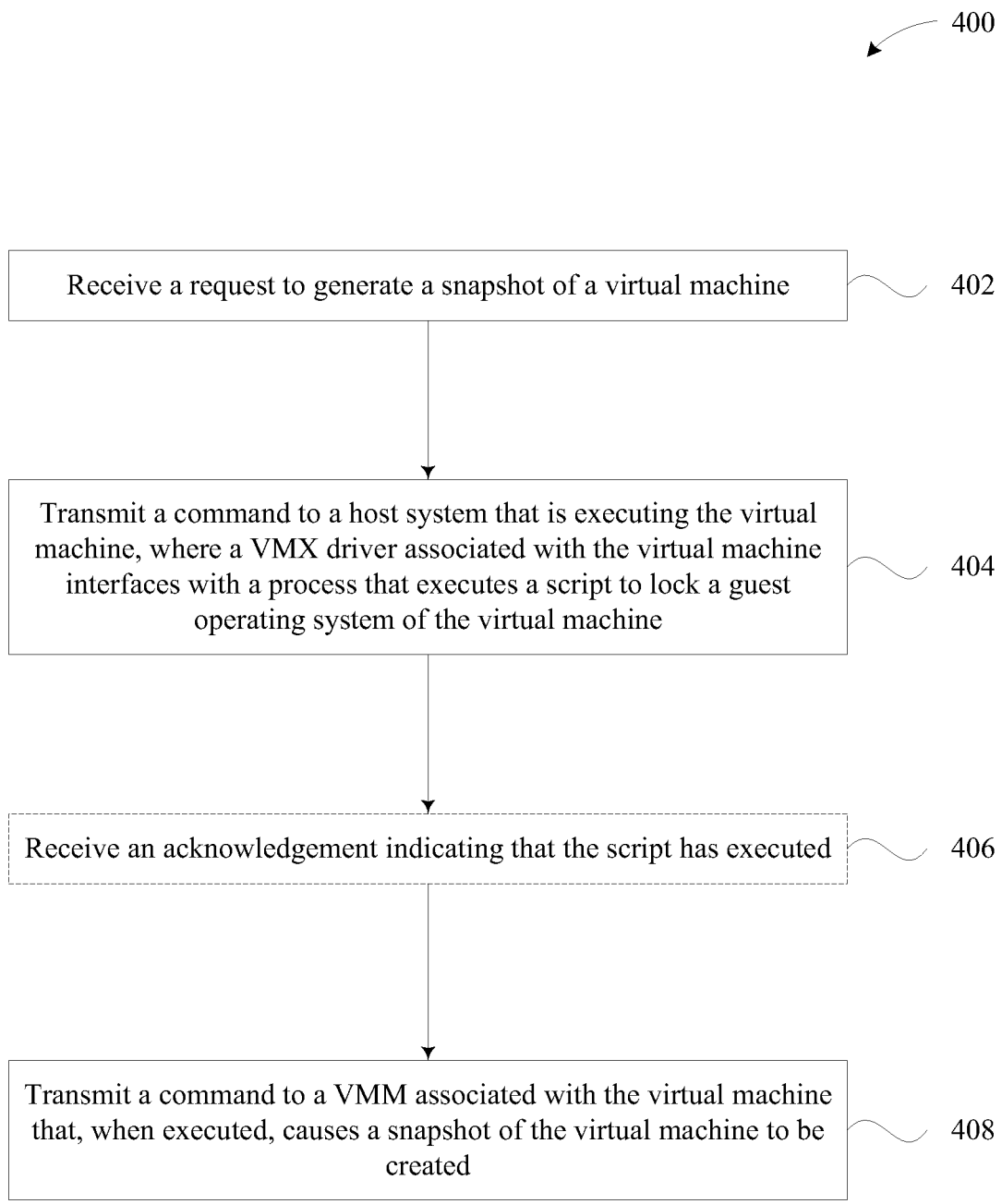
FIG. 4 is a flow diagram of method steps for creating a secure snapshot of a virtual machine via executable scripts, according to one embodiment of the present invention.

FIG. 4 is a flow diagram of method steps 400, performed by application 112 of FIG. 1, for creating a secure snapshot of VM 142-0 via scripts 212, according to one embodiment of the present invention. Although the method steps are described in conjunction with the system of FIGS. 1-3, it should be understood that there are other systems in which these or similar method steps may be carried out.

As shown, method steps 400 begin at step 402, where application 112 receives a request to generate a snapshot of VM 142-0. This request is generated, e.g., by a user who is interacting with GUI 114 and selects UI element snapshot 310. Requests or other triggers for generating snapshots can be generated by other means as well, such as periodically or in response to the detection of some fault condition, or some other condition.

At step 404, application 112 transmits a command to VMX driver 206, which then interfaces with toolkit 210 to execute a particular script included in scripts 212 to lock guest operating system 208 of VM 142-0. The particular script is then executed within guest operating system 208 and causes guest operating system 208 to enter into a locked state. For example, when guest operating system 208 is a version of Microsoft Windows, scripts 212 includes the script "rundll32.exe user32.dll, LockWorkstation" that, when executed, forces the version of Microsoft Windows to enter into a locked state. In another example, when guest operating system 208 is a version of Linux, the command "$ gnome-screensaver-command –1", when executed, forces the version of Linux to enter into a locked state. Additional scripts are included in scripts 212 such that all types of guest operating systems 204 may be appropriately locked, e.g., "dcop kdesktop KScreensaverIface lock" for versions of K Desktop Environment (KDE), and "/System/Library/CoreServices/MenuExtras/User.menu/Contents/Resources/CGSession—suspend" for versions of Apple's Mac OSX. According to embodiments of this invention, a guest operating system is automatically caused to enter a locked state, prior to taking a snapshot, in response to a request or trigger to generate a snapshot, without any action by a user or administrator directed towards causing the guest operating system to enter a locked state.

At optional step 406, application 112 receives an acknowledgement indicating that the script has executed. This acknowledgement is generated, e.g., by VMX driver 206 when it has determined that the particular script has completed in execution. In one embodiment, an additional script may be executed by VMX driver 206 to detect the state of guest operating system 208 to ensure that the particular script successfully placed the guest operating system 208 into a locked state. At step 408, application 112 transmits a command to VMM 204 that, when executed, causes a snapshot of virtual machine 142-0 to be generated.

Figure 5:
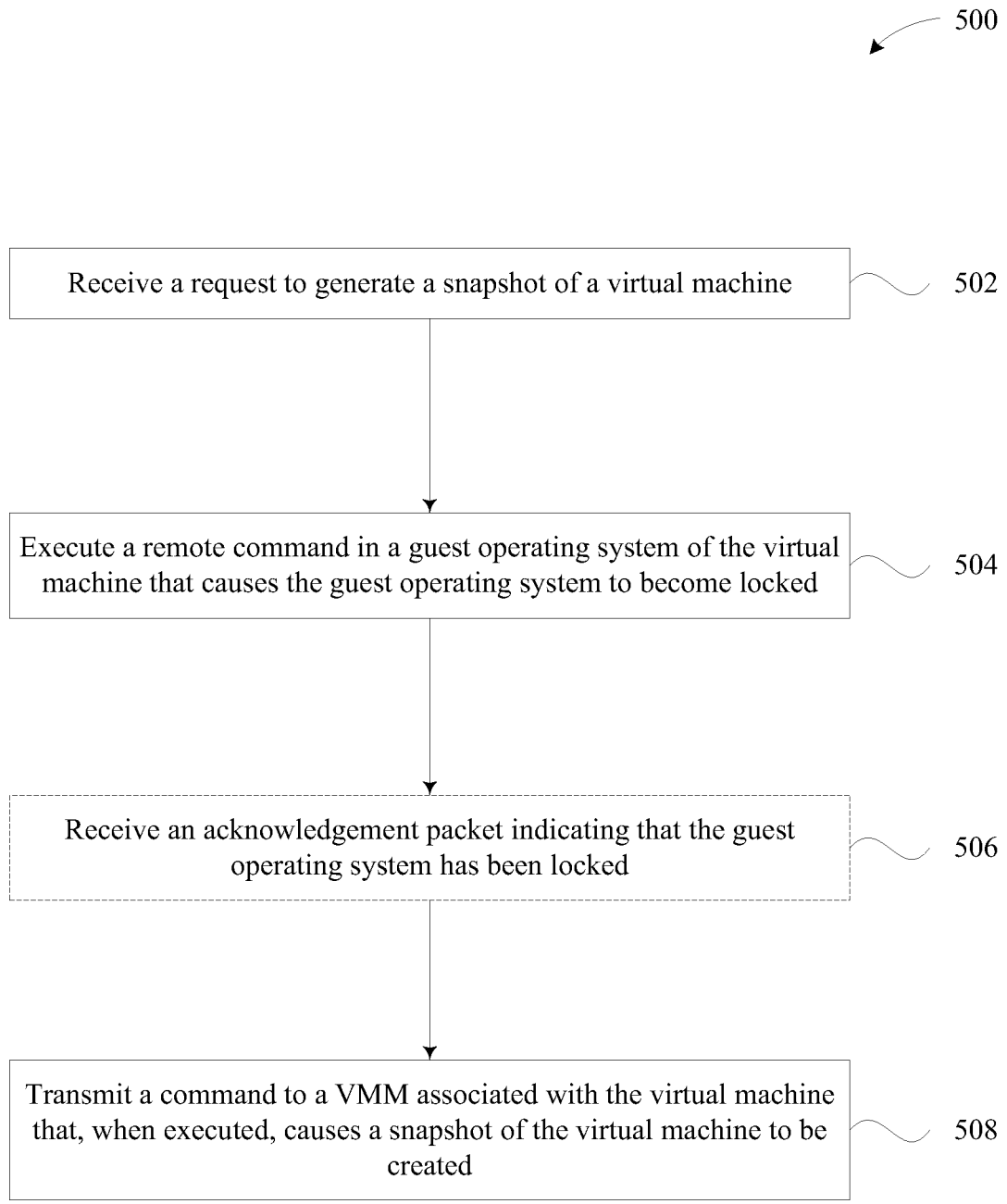
FIG. 5 is a flow diagram of method steps for creating a secure snapshot of a virtual machine via networking packets, according to one embodiment of the present invention.

FIG. 5 is a flow diagram of method steps 500, performed by application 112 of FIG. 1, for creating a secure snapshot of VM 144-0 via networking packets, according to one embodiment of the present invention. Although the method steps are described in conjunction with the system of FIGS. 1-3, it should be understood that there are other systems in which these or similar method steps may be carried out.

At step 502, application 112 receives a request to generate a snapshot of VM 144-0. At step 504, application 112 executes a remote command in guest operating system 208 of VM 144-0 that causes guest operating system 208 to become locked. Again, such network packets are configured and transmitted according to a type of the guest operating system 208, e.g., SSH packets when guest operating system 208 is Linux-based. At optional step 506, application 112 receives an acknowledgement packet indicating that guest operating system 208 has been locked. At step 508, application 112 transmits a command to VMM 204 that, when executed, causes a snapshot of VM 144-0 to be generated.

Figure 6:
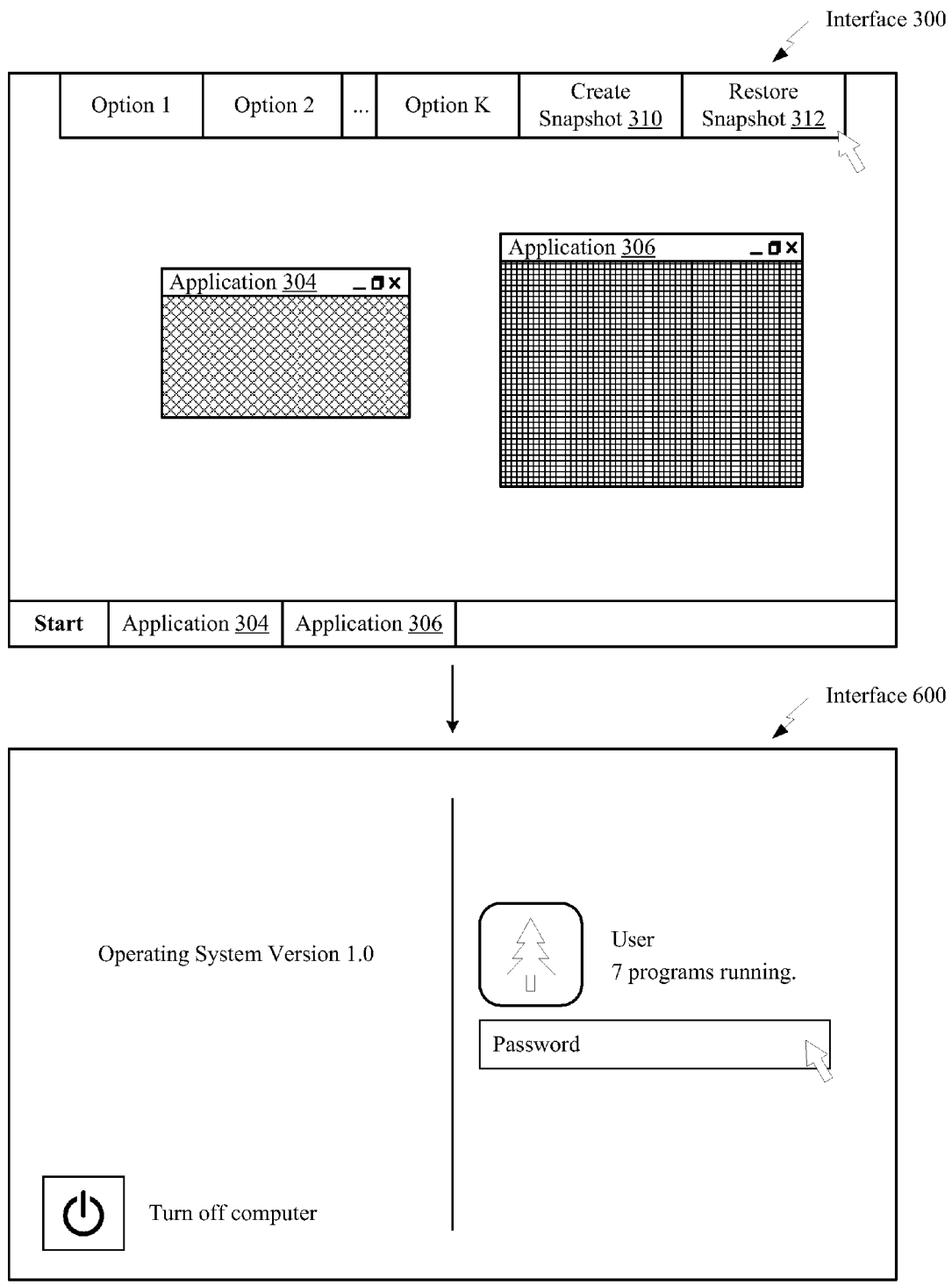
FIG. 6 illustrates a process for restoring a VM from a secure snapshot that has been created according to one or more embodiments of the present invention.

FIG. 6 illustrates the process of restoring VM 144-0 from a secure snapshot that has been created according to one or more embodiments of the present invention. As shown, to restore VM 144-0, the user first selects the command, restore snapshot 312. In one embodiment, when the command, restore snapshot 312, is selected by the user, he or she is presented with a list of secure snapshots, e.g., secure snapshots 162, whereupon he or she may select one of them to be restored, e.g., a secure snapshot of VM 144-0.

Upon successful restoration of VM 144-0, guest operating system 208 executing therein is in a locked state, which is illustrated as interface 600. Thus, before a user can access guest operating system 208, he or she must enter valid credentials into the login fields included in interface 600. As a result, guest operating system 208 is secured from access by unauthorized users who otherwise may have gained access to the secure snapshot of VM 144-0.

It should be recognized that various modifications and changes may be made to the specific embodiments described herein without departing from the broader spirit and scope of the invention as set forth in the appended claims. For example, a host system, such as host system 140-0, may be a desktop computer that is operated by a local user running a desktop virtualization solution, such as VMware's Workstation virtualization product. The user of the desktop computer may choose to create a secure snapshot according to embodiments of this invention. In some embodiments, a paravirtualized system may be implemented in which virtualization logic supporting a virtual machine running a guest operating system may communicate directly with the guest operating system to cause the guest operating system to enter a locked state before the virtualization logic creates a secure snapshot. In some embodiments, a user may be given a choice of selecting a secure snapshot or a snapshot for which the guest operating system is not locked prior to taking the snapshot.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for generating a snapshot of a virtual machine, comprising:
   receiving a trigger to generate the snapshot of the virtual machine;
   in response to the trigger, transmitting a first command to lock an operating system being executed by the virtual machine, wherein the first command is directed to the virtual machine and causes the virtual machine to execute one or more scripts included in the operating system to force the operating system into a locked state; and
   transmitting a second command to create the snapshot of the virtual machine,
   wherein, in the snapshot, the operating system executed by the virtual machine is in the locked state and protected by a login screen that requires credentials of an authorized user to be entered to access the operating system after the virtual machine is restored from the snapshot, and
   wherein the second command is transmitted after an acknowledgement is received that indicates the operating system is in the locked state.

2. The method of claim 1, wherein the one or more scripts are included in a virtual machine software package that is specific to a type of the operating system.

3. The method of claim 1, wherein the first command is directed to the operating system via one or more network packets that, when received by the operating system, forces the operating system into the locked state.

4. The method of claim 3, wherein the network packets are received by the operating system via a virtual network interface card that is managed by the virtual machine.

5. The method of claim 3, wherein the network packets are processed by an application included in the operating system.

6. The method of claim 3, wherein the network packets are processed by a third party application executing on the operating system.

7. The method of claim 1, wherein the second command is directed to a virtual machine monitor and causes the virtual machine monitor to create the snapshot of the virtual machine.

8. The method of claim 1, further comprising:
   storing the snapshot of the virtual machine in a non-volatile storage.

9. A non-transitory computer readable storage medium storing instructions to be executed in a processing unit of a computer system, wherein the instructions when executed in the processing unit carry out the steps of:
   receiving a first command to force an operating system into a locked state;
   parsing one or more scripts included in the operating system to locate a script that, when executed, forces the operating system into the locked state;
   causing the script to be executed; and
   receiving an acknowledgement that the script has executed,
   wherein the operating system is executed by a virtual machine,
   wherein a snapshot is taken of the virtual machine responsive to a second command after the acknowledgement is received indicating the operating system is in the locked state, and
   wherein, in the snapshot, the operating system executed by the virtual machine is in the locked state and protected by a login screen that requires credentials of an authorized user to be entered to access the operating system after the virtual machine is restored from the snapshot.

10. The non-transitory computer readable storage medium of claim 9, wherein the first command is received from a virtual machine administrative application.

11. The non-transitory computer readable storage medium of claim 9, wherein the one or more scripts are included in a virtual machine software package that is specific to a type of the operating system.

12. A non-transitory computer readable storage medium storing instructions to be executed in a processing unit of a computer system, wherein the instructions when executed in the processing unit carry out the steps of:
   receiving a trigger to generate a snapshot of the virtual machine;
   transmitting, via one or more network packets, a first command and one or more scripts that, when received and processed by an operating system being executed by the virtual machine, forces the operating system into a locked state; and
   transmitting a second command to create the snapshot of the virtual machine, wherein, in the snapshot, the operating system executed by the virtual machine is in the locked state and protected by a login screen that requires credentials of an authorized user to be entered to access the operating system after the virtual machine is restored from the snapshot, and wherein the second command is transmitted after an acknowledgement is received that indicates the operating system is in the locked state.

13. The non-transitory computer readable storage medium of claim 12, wherein the network packets are received by the operating system via a virtual network interface card that is managed by the virtual machine.

14. The non-transitory computer readable storage medium of claim 13, wherein the network packets are processed by an application included in the operating system.

15. The non-transitory computer readable storage medium of claim 13, wherein the network packets are processed by a third party application executing on the operating system.

16. The non-transitory computer readable storage medium of claim 12, wherein the second command is directed to a virtual machine monitor and causes the virtual machine monitor to create the snapshot of the virtual machine.

17. The non-transitory computer readable storage medium of claim 12, further comprising:

storing the snapshot of the virtual machine in a non-volatile storage.

18. A computer system comprising:

a processor; and a memory comprising computer instructions that cause the processor to perform steps for generating a snapshot of a virtual machine, the steps comprising:

receiving a trigger to generate the snapshot of the virtual machine, in response to the trigger, transmitting a first command to lock an operating system being executed by the virtual machine, and transmitting a second command to create the snapshot of the virtual machine, wherein, in the snapshot, the operating system executed by the virtual machine is in a locked state protected by a login screen that requires credentials of an authorized user to be entered, after the virtual machine is restored from the snapshot to an identical state to when the snapshot was created, to access the operating system, and wherein the second command is transmitted after an acknowledgement is received that indicates the operating system is in the locked state.

\* \* \* \* \*